J. W. RICHARDS & M. M. BOHONAN.
Lantern-Chimneys.
No. 157,928.　　　　　　　　　　Patented Dec. 22, 1874.
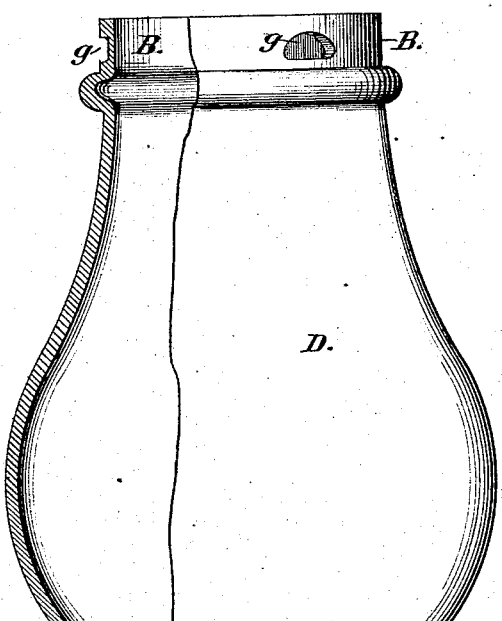
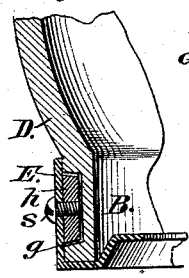
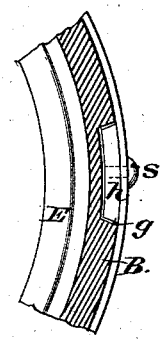
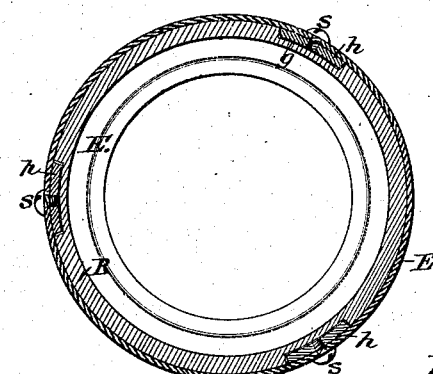
Witnesses:
John E. Crane.
Wm. S. Brown.
Inventors.
John W. Richards
Morrill M. Bohonan

UNITED STATES PATENT OFFICE.

JOHN W. RICHARDS, OF CHELMSFORD, AND MORRILL M. BOHONAN, OF LOWELL, ASSIGNORS TO THE STANDARD-LAMP AND GLASS-PIPE COMPANY, OF BOSTON, MASSACHUSETTS.

IMPROVEMENT IN LANTERN-CHIMNEYS.

Specification forming part of Letters Patent No. 157,928, dated December 22, 1874; application filed September 14, 1874.

*To all whom it may concern:*

Be it known that we, JOHN W. RICHARDS, of Chelmsford, and MORRILL M. BOHONAN, of Lowell, both in the county of Middlesex and State of Massachusetts, have invented certain new and useful Improvements in Lantern-Chimneys, of which the following is a specification, in connection with the accompanying drawings forming part thereof, in which drawings—

Figure 1 represents a side elevation of a lantern-globe, partly in section, and with our improvements thereunto applied. Fig. 2 represents a horizontal plan section on the line $a$ $b$ of Fig. 1. Figs. 3 and 4 are detached sections enlarged.

This invention relates to, and consists of, certain new and useful improvements in the mode or means of applying, securing, and retaining the connecting-rings on the top and bottom ends of the lantern-globe, and of making said rings readily removable, to substitute a perfect globe or glass for one broken or injured.

At the end or ends of the globe there are necks or flanges B, of glass, each neck of the proper size to fit a metal ring, E, to be attached to it, the principal new features of the invention being recesses $g$ in the periphery of the top and bottom flanges, necks, or rings B of the globe D, and plate-nuts $h$ placed in such recesses, and draft-screws S passing through each ring and entering the nuts, and drawing the latter firmly against the inner surface of the ring or rings E, thus securing each ring to the glass globe without pressure upon the glass, and leaving ample space between each nut and the glass at the back of each recess, and room between the metal ring and the glass for expansion of the latter when heated, which, with the convenience of application and removal of the rings, and the economy of time and materials in removing and replacing glass globes, and the saving of rings, are the principal objects of our invention.

Our said invention is adapted for connecting the hinging and fastening rings of lamp-chimneys to their lower ends, and of connecting rings to various other glass articles, either to their ends or to any part of such articles between their ends, where they are liable to be exposed to heat to cause expansion of the glass, simply by forming the recesses in the outer periphery of the article, and by the application of the plate-nuts to the recesses, and by the draft-screws passing through a loosely or proper fitting ring, as in those shown in drawings.

We claim as our invention—

The combination of the glass neck B, provided with recesses $g$, with the metal ring E, the draft-screws S, and plate-nuts $h$, substantially as described.

JOHN W. RICHARDS.
MORRILL M. BOHONAN.

Witnesses:
JOHN E. CRANE,
WM. S. BROWN.